United States Patent
Uehara et al.

(10) Patent No.: US 7,315,145 B2
(45) Date of Patent: Jan. 1, 2008

(54) SYSTEM OF CONTROLLING A SLIDING MEMBER FOR A VEHICLE

(75) Inventors: Tatsuaki Uehara, Tochigi (JP); Yuki Honjo, Tochigi (JP); Yoshiki Noro, Saitama (JP)

(73) Assignees: Honda Motor Co., Ltd., Tokyo (JP); Yachiyo Kogyo Kabushiki Kaisya, Saitama (JP)

( * ) Notice: Subject to any disclaimer, the term of this patent is extended or adjusted under 35 U.S.C. 154(b) by 60 days.

(21) Appl. No.: 11/101,056

(22) Filed: Apr. 6, 2005

(65) Prior Publication Data

US 2005/0218850 A1     Oct. 6, 2005

(30) Foreign Application Priority Data

Apr. 6, 2004  (JP) .............................. 2004-111764
Apr. 6, 2004  (JP) .............................. 2004-111765

(51) Int. Cl.
*H02P 7/00* (2006.01)
(52) U.S. Cl. ............... 318/432; 318/434; 318/461; 318/469; 318/283; 318/286; 318/599
(58) Field of Classification Search ............... 318/138, 318/439, 432, 434, 461–469, 283–286, 599
See application file for complete search history.

(56) References Cited

U.S. PATENT DOCUMENTS 5,459,379 A * 10/1995 Takeda et al. ............... 318/469
5,869,940 A * 2/1999 Parsadayan ................. 318/461
6,580,242 B2 * 6/2003 Hirose et al. ............... 318/445
6,940,246 B2 * 9/2005 Mochizuki et al. ......... 318/469
7,073,291 B2 * 7/2006 Kawanobe et al. ............ 49/26

FOREIGN PATENT DOCUMENTS

| JP | 10-262385 | 9/1998 |
| JP | 2000-314271 | 11/2000 |
| JP | 2001-180283 | 7/2001 |
| JP | 2002-103979 | 4/2002 |

* cited by examiner

*Primary Examiner*—Lincoln Donovan
*Assistant Examiner*—Tyrone Smith
(74) *Attorney, Agent, or Firm*—Fish & Richardson P.C.

(57) ABSTRACT

A system of controlling a sliding member for a vehicle includes a motor, a pulse generating device, a counting device and a control device. The system has a range for movement of the sliding member between a position short of a first lock position and a position short of a second lock position. Also, the system has an error range within the range for movement of the sliding member and memorizes in advance a range of pulse count representative of the error range. If a pulse count counted by the counting device falls within the range of pulse count when the sliding member discontinues movement due to detection of an overload of the motor, the system resets a pulse count counted by the counting device at one of the first and second lock positions.

4 Claims, 5 Drawing Sheets

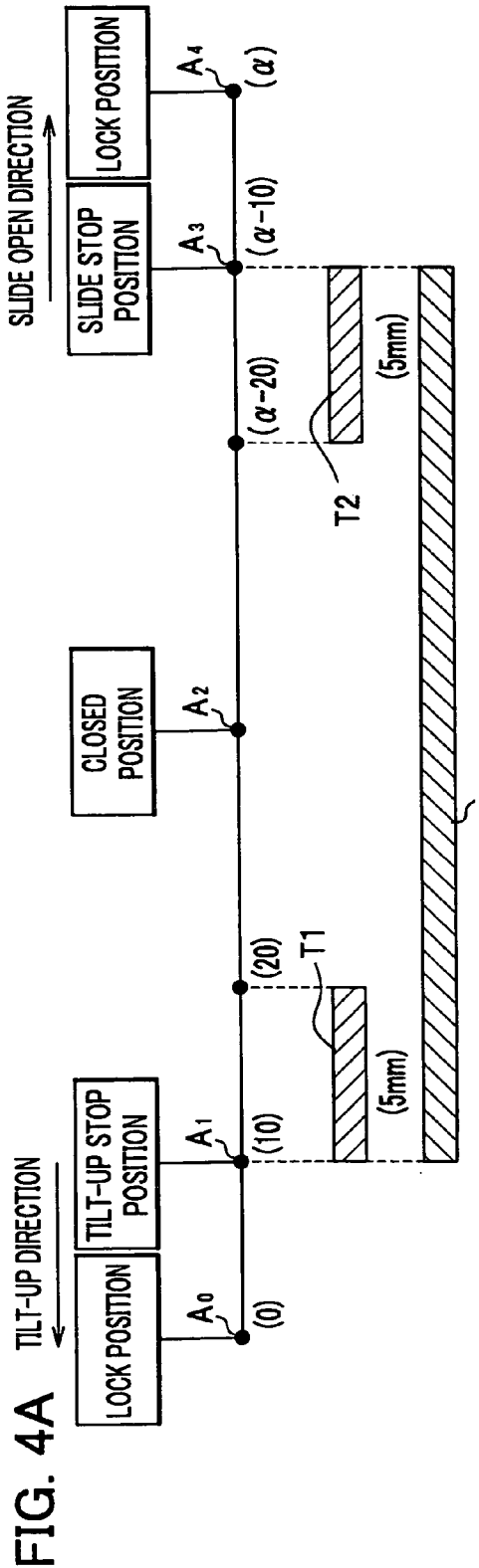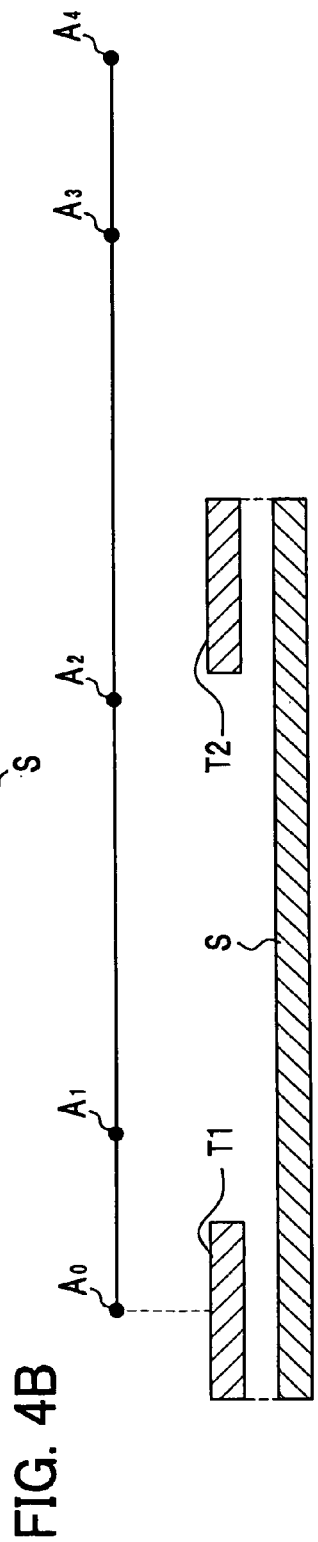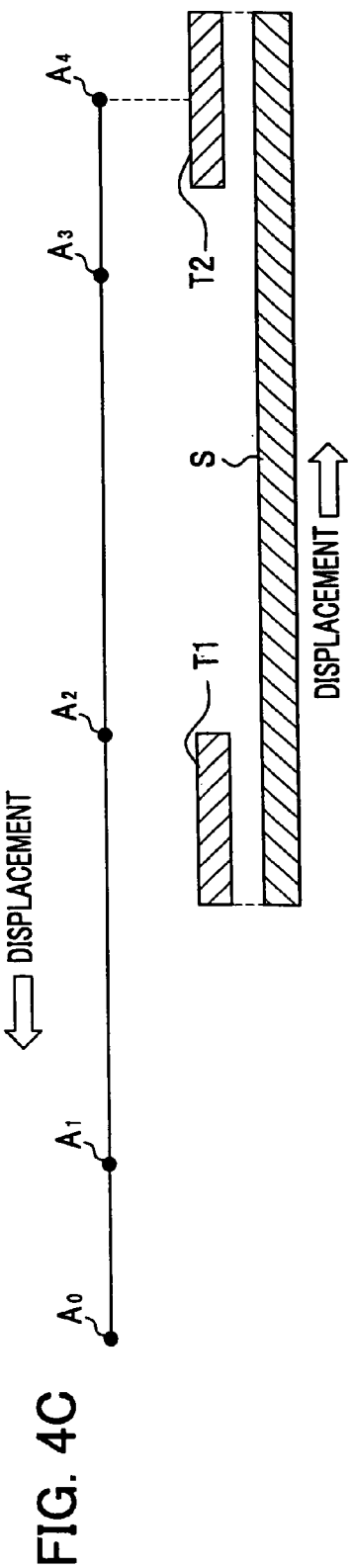

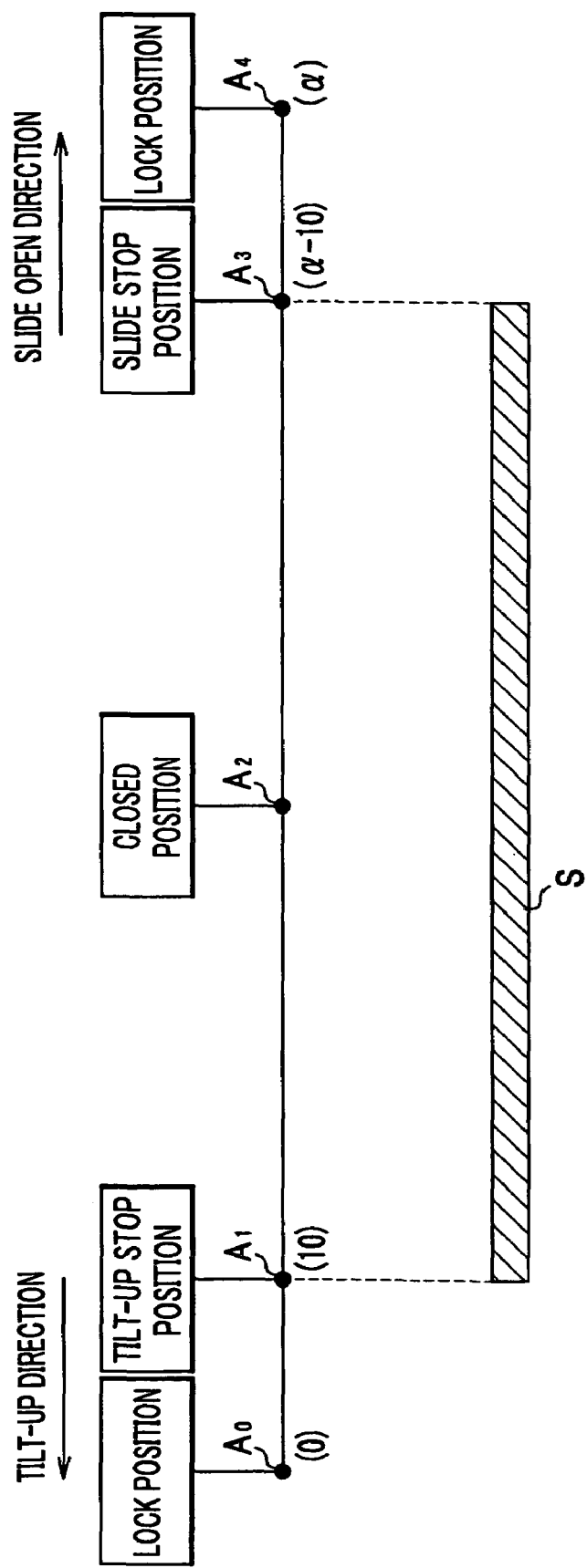

SYSTEM OF CONTROLLING A SLIDING MEMBER FOR A VEHICLE

BACKGROUND OF THE INVENTION

The present invention relates to a system of controlling a sliding member for a vehicle, which is used for a sliding roof in a sunroof apparatus, for example.

A sliding roof has been used for a vehicle, which is mounted for the purpose of controlling the temperature of its cabin or providing a feeling of freedom for its passengers. This sliding roof is usually driven by a motor, which allows not only its sliding movement between open and closed positions, but also its tilting movement by lifting its end portion at this closed position.

A technique for controlling a sliding roof is disclosed, which selects mechanically locked positions at its open position and tilted position as reference positions, where the sliding roof discontinues its movement as a result of mechanical contact to a periphery of opening. Related arts are disclosed in Japanese Published Patent Application 2001-180283.

The technique disclosed in JP2001-180283 has a drawback that a sliding roof creates colliding noise or a motor generates uncomfortable noise such as beat noise. The reason for this phenomenon lies in the fact that the technique employs a reference point defined at a mechanically locked position in order to count pulse, where a sliding roof mechanically contacts with the periphery of opening. It may be anticipated that a method, which controls a sliding roof so as to stop slightly short of an open position or tilted position where the sliding roof contacts with the periphery of opening, possibly avoids creation of the noise.

However, it may occur that an actual position of sliding roof deviates from a theoretical position defined in a control system in the form of pulse counts. If no correction is imposed on this type of deviation, an anomaly such as erroneous creation of a gap between the sliding roof and the periphery of opening may occur, resulting in rain leaking.

Accordingly, even if the method described above is introduced for improving the technique disclosed in the patent document, there still remains a problem to be solved that displacement of sliding roof needs to be reliably detected so as to implement appropriate control for the position of sliding roof.

Furthermore, it is necessary to provide a system of controlling a sliding roof which is able to distinguish one type of irregular discontinuation of movement of the sliding roof caused by an obstacle between the sliding roof and the periphery of opening from the other type caused by displacement of the sliding roof.

SUMMARY OF THE INVENTION

The present invention seeks to provide a system of controlling a sliding roof for a vehicle, which is able to solve the problems described above.

It is an aspect of the present invention to provide a system of controlling a sliding member for a vehicle, which comprises a motor, a pulse generating device, a counting device and a control device. Brief description is given of each of these components. The motor provides driving force to the sliding member. The pulse generating device generates pulses according to rotation of the motor. The counting device conducts one of counting-up and counting-down of the pulses relative to a lock position where the sliding member is mechanically locked. And the control device controls the motor according to output signals generated by the counting device.

The system has a range for movement of the sliding member between a position short of a first lock position and a position short of a second lock position. Also, the system has an error range within the range for movement of the sliding member and memorizes in advance a range of pulse count representative of the error range. If a pulse count counted by the counting device falls within the range of pulse count when the sliding member discontinues movement due to detection of an overload of the motor, the system resets a pulse count counted by the counting device at one of the first and second lock positions.

The system described above is able not only to prevent colliding noise at discontinuation of movement of the sliding member, but also to correct displacement of the sliding member, which may lead to rain leak at a closed position, by implementing reliable detection of the displacement with introduction of the error range.

It is another aspect of the present invention to provide a system, in which the error range comprises two portions and each of the portions is provided for an end portion of the range for the movement of the sliding member.

The system described above is able to detect displacement of the sliding member which may lead to rain leak.

It is still another aspect of the present invention to provide a system of controlling a siding member for a vehicle, which comprises a motor, a pulse generating device, a counting device and a control device. The motor provides driving force to the sliding member. The pulse generating device generates pulses according to rotation of the motor. The counting device conducts one of counting-up and counting-down of the pulses relative to a lock position where the sliding member is mechanically locked. And a control device controls the motor according to output signals generated by the counting device.

The system has a range for movement of the sliding member between a position short of a first lock position and a position short of a second lock position. If the sliding member discontinues movement due to detection of an overload of the motor, the system automatically selects a manual mode for the sliding member. Subsequently, if the sliding member stops at a normal position during a subsequent movement, the system automatically restores an automatic mode.

The system described above provides reliable detection of displacement of the sliding member, which is able to distinguish irregular discontinuation of movement due to an external cause such as a foreign obstacle between the sliding member and the periphery of opening from that caused by displacement of the sliding member.

It is yet another aspect of the present invention to provide a system of controlling a siding member for a vehicle, which comprises a motor, a pulse generating device, a counting device and a control device. The motor provides driving force to the sliding member. The pulse generating device generates pulses according to rotation of the motor. The counting device conducts one of counting-up and counting-down of the pulses relative to a lock position where the sliding member is mechanically locked. And the control device controls the motor according to output signals generated by the counting device.

The system has a range for movement of the sliding member between a position short of a first lock position and a position short of a second lock position. If the sliding member discontinues movement at a position due to detection of an overload of the motor, the system automatically selects a manual mode for the sliding member. Furthermore, if the sliding member stops at the same position during a subsequent movement and a pulse count counted by the counting device falls within a predetermined range, the system resets a pulse count counted by the counting device at one of the first and second lock positions.

The system described above provides reliable detection of displacement of the sliding member.

BRIEF DESCRIPTION OF THE DRAWINGS

FIG. 4A is a schematic diagram showing pulse counts assigned for positions of a sliding roof.

FIG. 4B is a schematic diagram illustrating displacement in a tilt-up direction.

FIG. 4C is a schematic diagram illustrating displacement in a slide open direction.

FIG. 5 is a schematic diagram illustrating positions of a sliding roof and corresponding pulse counts.

DESCRIPTION OF THE PREFERRED EMBODIMENTS

Embodiments of the present invention are now described with reference to the accompanying drawings.

Figure 1:
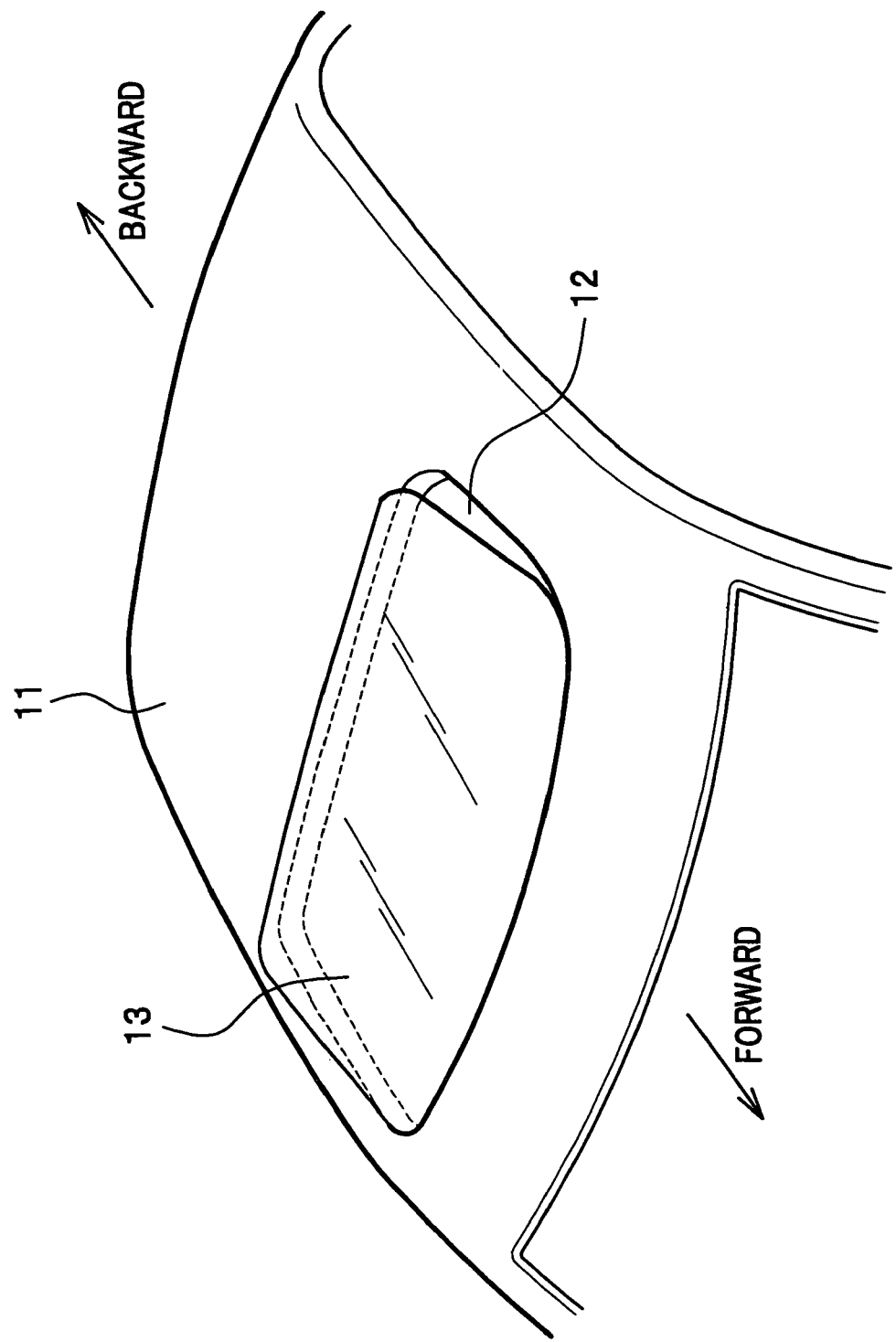
FIG. 1 is a perspective view illustrating a sliding roof mounted on a vehicle.

As shown in FIG. 1, an opening 12 is provided in a stationary roof 11 and a sliding member 13 (hereinafter referred to as "sliding roof 13") is movably installed in the opening 12. The sliding roof 13 has an open position and a tilted position so that ventilation of a cabin of the vehicle is carried out. The sliding roof 13 has a movable push-pull cable (not shown), which provides the sliding roof 13 with freedom of movement while it receives electric power.

Figure 2:
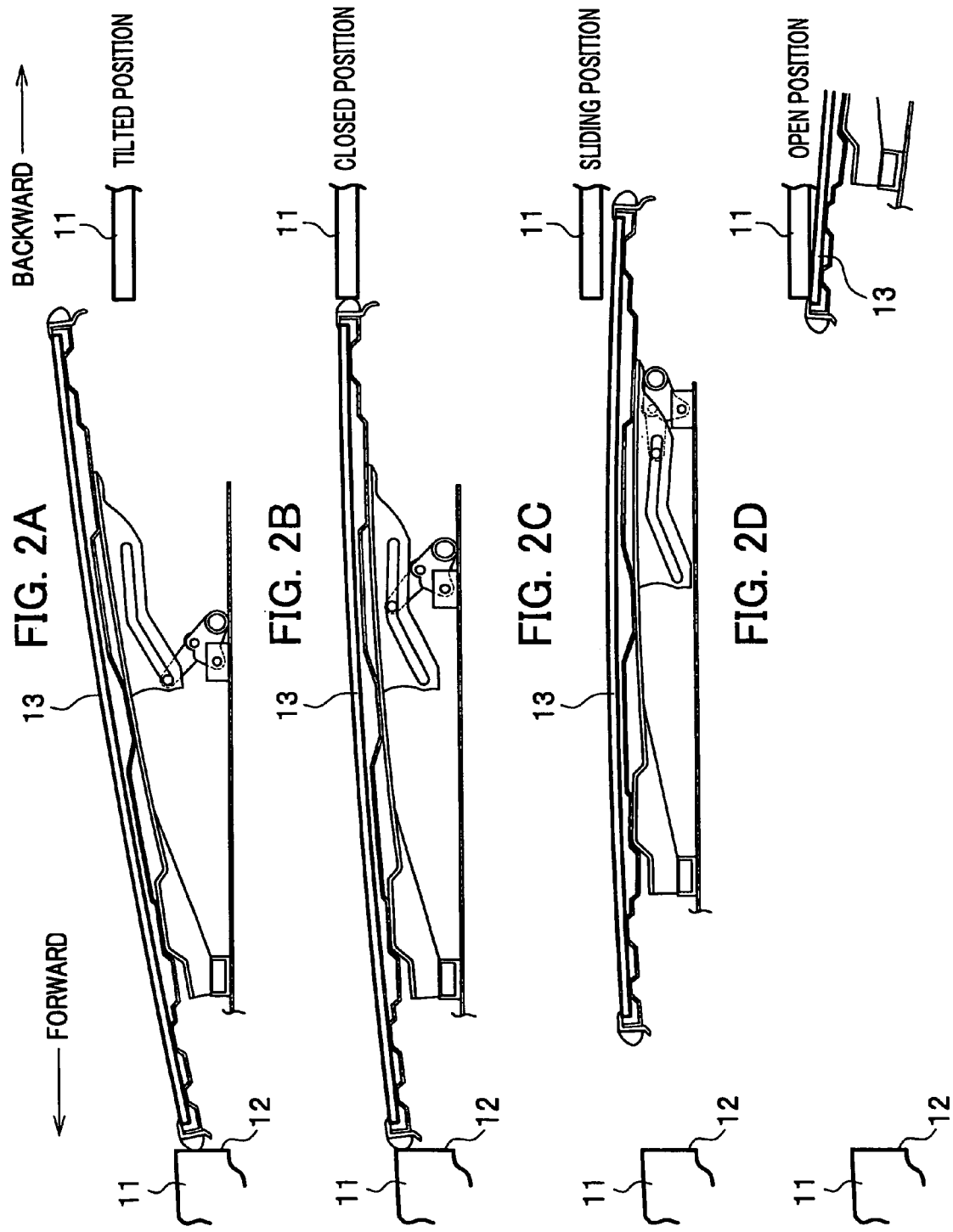
FIG. 2A is a schematic diagram illustrating a tilted position of sliding roof.
FIG. 2B is a schematic diagram illustrating a closed position of sliding roof.
FIG. 2C is a schematic diagram illustrating a sliding position of sliding roof.
FIG. 2D is a schematic diagram illustrating an open position of sliding roof.
Figure 3:
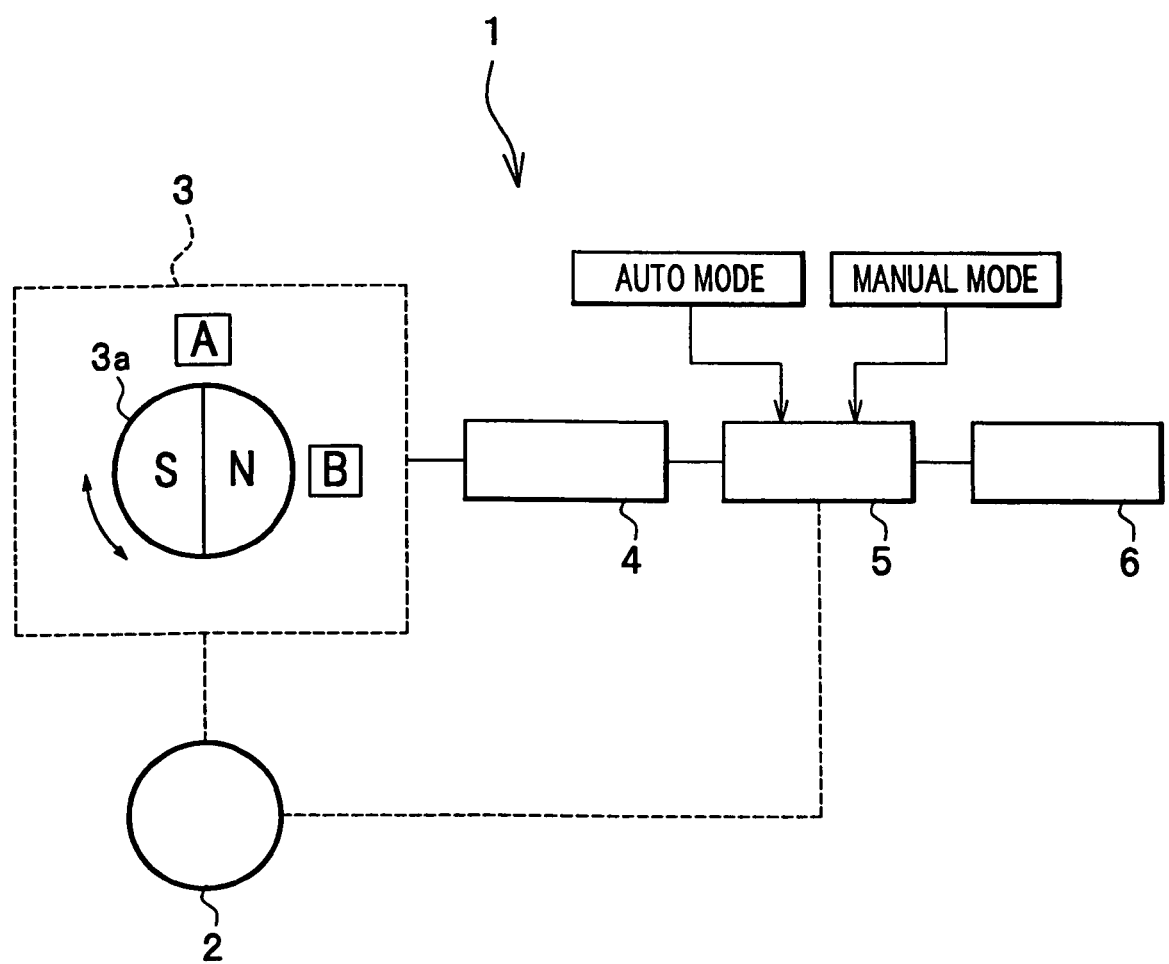
FIG. 3 is a block diagram showing a control system according to the present invention.

The sliding roof 13 moves in the following manner. When a motor 2 (see FIG. 3) starts rotation in one direction at an open position shown in FIG. 2D, the sliding roof 13 initiates sliding as shown in FIG. 2C, then settling in a closed position shown in FIG. 2B. If the motor 2 continues rotation in the same direction, the sliding roof 13 reaches a tilted position shown in FIG. 2A. This direction of movement of the sliding roof 13 is referred to as "tilt-up direction". On the other hand, when the motor 2 starts rotation in the opposite direction at the tilted position shown in FIG. 2A, the sliding member 13 goes back to the closed position shown in FIG. 2B. If the motor 2 continues rotation in the same direction, the sliding roof 13 initiates sliding as shown in FIG. 2C, then reaching the open position shown in FIG. 2D. This direction of movement of the sliding roof 13 is referred to as "slide open direction".

The control system 1 includes the motor 2, a pulse generating device 3, a counting device 4 and a control device 5. The motor 2 provides driving force to the sliding roof 13. The pulse generating device 3 generates pulses according to rotation of the motor 2. The counting device 4 conducts one of counting-up and counting-down of pulses relative to a reference position where the sliding roof 13 is mechanically locked. This position is hereinafter referred to as "lock position". The control device 5 controls the motor 2 according to output signals counted by the counting device 4. For example, the pulse generating device 3 comprises a rotor $3a$ made of a magnet and a pair of sensors A and B, such as hole IC. In this connection, the pulse generating device 3 is able to detect the rotational direction of rotor $3a$, namely the rotational direction of motor 2, in addition to the number of pulses.

A signal indicative of one of auto and manual modes enters the control device 5. The auto mode is meant to represent a mode that the sun roof 13 automatically continues sliding and tilting until it reaches stop positions, such as a tilted position and a closed position, if the auto mode is selected by turning on a switch (not shown) by one touch action. On the other hand, the manual mode is meant to represent a mode that the sliding roof 13 only conducts sliding and tilting while the switch is being activated.

a. First Embodiment

The counting device 4 counts up or down pulses relative to a lock position as described above. In FIGS. 4A to 4C, the counting device 4 counts pulses, selecting a lock position $A_0$ (pulse count "0") as a reference point, which corresponds to a tilted position. The other lock position $A_4$, which corresponds to an open position, is given a pulse count $\alpha$. A closed position $A_2$ is located between the lock positions $A_0$ and $A_4$.

If positions for stopping the sliding roof 13 are adapted to coincide with the lock positions $A_0$ and $A_4$, colliding noise may likely occur as described above. In order to overcome this problem, the present invention introduces a tilt-up stop position $A_1$, which is positioned slightly short of the lock position $A_0$, and a slide stop position $A_3$, which is positioned slightly short of the lock position $A_4$. Furthermore, the present invention introduces an operation range S for the sliding roof 13, which covers the position $A_1$ to the position $A_3$. As shown in FIG. 4A, a pulse count "10" is assigned for the position $A_1$ and a pulse count "$\alpha$-10" for the position $A_3$. These pulse counts are stored in a memory device 6 shown in FIG. 3.

As long as the sliding roof 13 has no displacement, the sliding roof 13 normally works and stops at the tilt-up stop position $A_1$. In this case, the counting device 4 counts "10" at the position $A_1$, which coincides with the pulse count "10" stored in the memory device 6. Accordingly, the control device 5 commands discontinuation of rotation for the motor 2. Similarly, the sliding roof 13 normally works and stops at the slide stop position $A_3$. In this case, the counting device 4 counts "$\alpha$-10" at the position $A_1$, which coincides with the pulse count "$\alpha$-10" stored in the memory device 6.

Next, an error range is introduced, which lies within the operation range S. A range of pulse count representative of the error range is stored in the memory device 6. As shown in FIG. 4, error ranges T1 and T2 are introduced, for which ranges of pulse count "10 to 20" and "$\alpha$-20 to $\alpha$-10" are assigned, respectively. These ranges correspond to 5 mm when they are transformed into a distance of movement for the sliding roof 13.

Description is given of a case where the sliding roof 13 is brought to operation in the tilt-up direction. As shown in FIG. 4B, when the sliding roof 13 has displacement relative to the motor 2 in the tilt-up direction, the sliding roof 13 does not work normally. In this case, the sliding roof 13 reaches the tilt-up stop position $A_1$ before the counting device 4 counts down to "10". The sliding roof 13 passes the position $A_1$ and continues its movement until it is forcefully brought to a stop at the lock position $A_0$. Because the counting device 4 has not yet counted down to "10" at the moment and the motor 2 is in operation, the forceful discontinuation of the sliding roof 13 imposes an overload on the motor 2.

Detecting the overload imposed on the motor 2, the control device 5 determines that the sliding roof 13 has been brought to a stop. If the pulse count counted by the counting device 4 at the moment falls in the range 10 to 20, which is assigned for the error range T1 and stored in the memory device 6, the control device 5 determines that the sliding roof 13 has displacement, thereby replacing the pulse count counted by the counting device 4 at the lock position $A_0$ with a pulse count "0". In this way, it is possible to correct the displacement. Furthermore, the control device 5 automatically selects a manual mode for the sliding roof 13.

As shown in FIG. 4C, when the sliding roof 13 has displacement in the slide open direction relative to the motor 2, the movement of sliding roof 13 is described similarly. In this case, the sliding roof 13 reaches the slide stop position $A_3$ before the counting device 4 counts up to "α−10". The sliding roof 13 passes the position $A_3$ and continues its movement until it is forcefully brought to a stop at the lock position $A_4$. Because the counting device 4 has not yet counted up to "α−10" at the moment and the motor 2 is in operation, the forceful discontinuation of the sliding roof 13 imposes an overload on the motor 2.

Detecting the overload imposed on the motor 2, the control device 5 determines that the sliding roof 13 has brought to a stop. If the pulse count counted by the counting device 4 falls in the range "α−20 to α−10", which is assigned for the error range T2 and stored in the memory device 6, the control device 5 determines that the sliding roof 13 has displacement, thereby replacing the pulse count counted by the counting device 4 at the lock position $A_4$ with a pulse count "α". In this way, it is possible to correct the displacement. Furthermore, the control device 5 automatically selects a manual mode for the sliding roof 13.

The present invention described above is able not only to prevent colliding noise when the sliding roof 13 comes to a stop, but also to provide the control system 1 that can correct displacement by its easier detection as a result of introducing the error ranges T1 and T2. In addition, the error ranges T1 and T2 which are provided at the both end portions of the movement range S of sliding roof 13 make it possible to distinguish displacement that may lead to rain leak from discontinuation of movement of the sliding roof 13 caused by an obstacle, a human hand for example. This is ascribed to the fact that the error ranges T1 and T2 are adapted to be so small that the pulse count counted by the counting device 4 for discontinuation of movement of the sliding roof 13 due to an obstacle hardly falls in an error range T1 or T2.

b. Second Embodiment

As shown in FIG. 5, pulse counts are assigned for the positions of a sliding roof 13 in a similar manner as that of the embodiment 1.

Detecting an overload for a motor 2 when the sliding roof 13 comes to a stop, a control device 5 automatically selects a manual mode for the sliding roof 13. If the sliding roof 13 normally stops during a subsequent movement, the control device 5 automatically restores an automatic mode for the sliding member 13. In this way, it is possible to distinguish one type of irregular discontinuation due to an obstacle between the sliding member 13 and an opening 12 from the other type caused by displacement of the sliding member 13. This results in reliable detection of displacement of the sliding roof 13.

When not only the sliding roof 13 repeats irregular discontinuation of its movement due to overloading of the motor 2 at a position twice or more, but also pulse counts counted by a counting device 4 fall in a predetermined range, the control device 5 automatically selects a manual mode for the sliding roof 13 and resets the pulse count of a lock position. In this way, it is possible to provide reliable detection of displacement for the sliding roof 13.

The predetermined range may be adapted to be ±10 counts, for example.

While the invention has been described in detail and with reference to specific embodiments thereof, it will be apparent to one skilled in the art that various changes and modifications can be made therein without departing from the spirit and scope thereof. In the embodiments described above, description has been given of a control system for a sliding roof mounted on a vehicle. It is anticipated that it is possible to apply this control system to any other use as long as it is related to a sliding roof (member).

Foreign priority document, JP2004-111764 filed on Apr. 6, 2004 and JP2004-111765 filed on Apr. 6, 2004, are hereby incorporated by reference.

What is claimed is:

1. A system of controlling a sliding member for a vehicle comprising:

a motor for driving the sliding member;

a pulse generating device which generates pulses according to the rotation of the motor;

a counting device which conducts one of counting-up and counting-down of the pulses relative to a lock position where the sliding member is mechanically locked; and a control device which controls the motor according to output signals generated by the counting device;

wherein the system has a range for movement of the sliding member between a position short of a first lock position and a position short of a second lock position, wherein the system has an error range within the range for movement of the sliding member and memorizes in advance a range of pulse count representative of the error range, wherein the error range comprises a first portion and a second portion, each of which is at an end portion of the range for the movement of the sliding member, the first portion being contiguous to the position short of the first lock position and the second portion being contiguous to the position short of the second lock position, and wherein if a pulse count counted by the counting device when the sliding member discontinues movement due to detection of an overload of the motor falls within the range of pulse count corresponding to the first portion of the error range, the system automatically resets the pulse count to a pulse count corresponding to the first lock position, whereas if a pulse count counted by the counting device when the sliding member discontinues movement due to detection of an overload of the motor falls within the range of pulse count corresponding to the second portion of the error range, the system automatically resets the pulse count to a pulse count corresponding to the second lock position.

2. The system according to claim 1, wherein if the sliding member discontinues movement due to detection of an overload of the motor, the system automatically selects a manual mode for the sliding member.

3. The system according to claim 1,
wherein if the sliding member discontinues movement due to detection of an overload of the motor, the system automatically selects a manual mode for the sliding member, and if the sliding member stops at a normal position during a subsequent movement, the system automatically restores an automatic mode.

4. The system according to claim 1,
wherein if the sliding member discontinues movement at a position due to detection of an overload of the motor, the system automatically selects a manual mode for the sliding member, and if the sliding member stops at the same position during a subsequent movement and a pulse count counted by the counting device falls within a predetermined range, the system resets the pulse count to a pulse count corresponding to one of the first and second lock positions.

* * * * *